(12) United States Patent
Cooper et al.

(10) Patent No.: US 6,810,504 B2
(45) Date of Patent: Oct. 26, 2004

(54) SYSTEM AND METHOD FOR IMPLEMENTING A USER INTERFACE FOR USE WITH JAPANESE CHARACTERS

(75) Inventors: Michael D. Cooper, Santa Cruz, CA (US); Masatoshi Yoshizawa, Utsunomiya (JP)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

(21) Appl. No.: 10/039,397

(22) Filed: Jan. 3, 2002

(65) Prior Publication Data

US 2002/0055960 A1 May 9, 2002

Related U.S. Application Data

(62) Division of application No. 08/955,788, filed on Oct. 22, 1997, now Pat. No. 6,377,966.

(51) Int. Cl.[7] ................................................. G06F 3/14
(52) U.S. Cl. ........................ 715/535; 715/542; 345/703; 345/864
(58) Field of Search ................................. 707/535, 536, 707/541, 542; 345/703, 864

(56) References Cited

U.S. PATENT DOCUMENTS

| | | | | |
|---|---|---|---|---|
| 4,494,150 A | * | 1/1985 | Brickman et al. .......... 375/240 |
| 4,573,199 A | | 2/1986 | Chen et al. ................. 382/301 |
| 4,626,829 A | * | 12/1986 | Hauck ......................... 341/63 |
| 4,915,027 A | | 4/1990 | Ishibashi et al. ............ 101/486 |
| 4,937,745 A | * | 6/1990 | Carmon ....................... 707/535 |
| 4,943,868 A | | 7/1990 | Yoshinaga et al. .......... 358/403 |
| 4,988,998 A | * | 1/1991 | O'Brien ........................ 341/55 |
| 5,107,259 A | | 4/1992 | Weitzen et al. ............. 340/7.56 |
| 5,528,742 A | | 6/1996 | Moore et al. ................ 715/542 |
| 5,533,180 A | | 7/1996 | Zhou et al. .................. 715/542 |
| 5,625,375 A | | 4/1997 | Keen ......................... 345/472.1 |
| 5,678,045 A | * | 10/1997 | Bettels ........................ 707/200 |
| 5,708,844 A | | 1/1998 | Masu et al. ................. 715/542 |
| 5,713,033 A | * | 1/1998 | Sado ........................... 707/534 |
| 5,784,069 A | | 7/1998 | Daniels et al. .............. 345/467 |
| 5,786,776 A | | 7/1998 | Kisaichi et al. ............... 341/23 |
| 5,787,452 A | * | 7/1998 | McKenna .................... 707/536 |
| 5,802,538 A | * | 9/1998 | Ooishi ........................ 707/542 |
| 5,859,625 A | * | 1/1999 | Hartung et al. ............... 345/95 |
| 5,859,648 A | * | 1/1999 | Moore et al. ................ 345/471 |
| 5,923,778 A | | 7/1999 | Chen et al. .................. 382/185 |
| 5,956,656 A | | 9/1999 | Yamazaki .................... 340/7.55 |
| 5,977,948 A | * | 11/1999 | Nishibori ..................... 345/841 |
| 6,098,086 A | * | 8/2000 | Krueger et al. ............. 707/535 |
| 6,202,209 B1 | * | 3/2001 | Bartholomew et al. ..... 717/173 |

* cited by examiner

Primary Examiner—Stephen S. Hong
Assistant Examiner—Cesar B Paula
(74) Attorney, Agent, or Firm—Sawyer Law Group LLP

(57) ABSTRACT

A system and method for implementing a user interface for use with Japanese characters includes a font-encoder compiler on a host computer for encoding selected text strings and creating custom fonts, and further includes an electronic device which contains a standard font and a font manager. The font manager selectively accesses the standard font and the custom fonts to display the encoded text strings on the user interface of the electronic device. Specific characters may be selected by entering a hierarchical text edit dialog, choosing a character category, selecting an articulation group and then choosing a specific character from the selected articulation group.

12 Claims, 17 Drawing Sheets

FIG. 1 (PRIOR ART)

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 |   | = |   | 0 | @ | P |   | p | た | み | ※ | ー | タ | ミ | ☆ | ♪ |
| 1 | ♪ | あ | ! | 1 | A | Q | a | q | ち | む |   |   | チ | ム | ★ | 年 |
| 2 | ♠ | い | " | 2 | B | R | b | r | つ | め |   | シ | ツ | メ | ○ | 月 |
| 3 | ♣ | う | # | 3 | C | S | c | s | て | も |   | ス | テ | モ | ● | 日 |
| 4 | ♥ | え | $ | 4 | D | T | d | t | と | や |   | セ | ト | ヤ | ◎ | 時 |
| 5 | ♦ | お | % | 5 | E | U | e | u | な | ゆ |   | ソ | ナ | ユ | ◇ | 分 |
| 6 | を | か | & | 6 | F | V | f | v | に | よ |   | タ | ニ | ヨ | ◆ | 秒 |
| 7 | ぁ | き | ' | 7 | G | W | g | w | ぬ | ら |   | チ | ヌ | ラ | □ | 午 |
| 8 | い | く | ( | 8 | H | X | h | x | ね | り |   | ツ | ネ | リ | ■ | 前 |
| 9 | う | け | ) | 9 | I | Y | i | y | の | る |   | テ | ノ | ル | △ | 後 |
| A | え | こ | * | : | J | Z | j | z | は | れ |   | ト | ハ | レ | ▲ |   |
| B | お | さ | + | ; | K | [ | k | { | ひ | ろ |   | ナ | ヒ | ロ | ▽ |   |
| C | や | し | , | < | L | ¥ | l | \| | ふ | わ | ヤ | ニ | フ | ワ | ▼ |   |
| D | ゆ | す | - | = | M | ] | m | } | へ | ん | ユ | ヌ | ヘ | ン | ☞ |   |
| E | よ | せ | . | > | N |   | n |   | ほ | 『 | ヨ | ネ | ホ | ゛ | ☜ |   |
| F | っ | そ | / | ? | O |   | o |   | ま | 』 |   | ノ | マ | ゜ | ☝ |   |

FIG. 5A

SYSTEM AND METHOD FOR IMPLEMENTING A USER INTERFACE FOR USE WITH JAPANESE CHARACTERS

CROSS-REFERENCE TO RELATED APPLICATIONS

The present application is divisional of U.S. Ser. No. 08/955,788, filed Oct. 22, 1997 now U.S. Pat. No. 6,377,966 B1, and assigned of record to Flashpoint Technology, Inc., of Peterborough, N.H.

BACKGROUND OF THE INVENTION

1. Field of the Invention

This invention relates generally to user interfaces for electronic devices and relates more particularly to a system and method for implementing a user interface for use with Japanese characters.

2. Description of the Background Art

The efficient implementation of user interfaces is an important consideration for designers, manufacturers and users of electronic devices and systems. To achieve maximum effectiveness, a user interface may advantageously display information to a system user in the user's primary language. The English language is generally written using an alphabet of twenty-six letters derived from the Romans. Other written languages, however, may employ significantly greater numbers of written characters. An example of a written language that requires a relatively large number of written characters is the Japanese language.

Japanese typically utilizes several different writing systems in conjunction with each other to form a single unified written language system. For example, Hiragana and Katakana are parallel phonetic systems that each use over forty different characters. Hiragana is used primarily to write words of Japanese origin, while Katakana is used primarily to write words of non-Japanese origin. In addition, Kanji is an ideographic system of writing which utilizes thousands of different characters which each typically correspond to a specific Japanese word. Furthermore, modern written Japanese occasionally incorporates foreign words written in the previously-mentioned standard Roman alphabet.

From the foregoing discussion, it is apparent that languages like Japanese typically utilize a significantly greater number of written characters than languages like English which require only the twenty-six letters of the Roman alphabet. Therefore, implementing a Japanese user interface to support an extended number of written characters will require special system design considerations to effectively and efficiently convey written information to a system user.

For example, conventional Japanese fonts typically are encoded using a two-byte digital encoding method to accommodate the large number of characters. In contrast, fonts that use only the Roman characters may be encoded using only one byte of digital information. The double-byte encoding thus requires substantially greater system memory to contain the encoded Japanese fonts. The increased memory requirements have a detrimental economic impact on system manufacturing costs. The greater physical size of an increased-capacity memory may also present design problems in implementing small-sized or portable electronic devices.

Furthermore, many computer programming languages (for example, the C programming language) are designed for use with single-byte text string encoding systems. A double-byte encoding system thus adds significant complexity to the overall development process because many standard software routines would then have to be rewritten to achieve software compatibility.

A small-sized electronic device may typically have a limited keyboard or other input device for selecting and inputting Japanese characters. Such a limited input device may frequently lack sufficient input keys and features to efficiently view and select characters from among the substantial number of possible choices found in written Japanese.

Prior art solutions to the foregoing problems have included electronic devices that supported an extended range of Japanese written characters with the associated problems discussed above. Alternatively, other prior art electronic devices have severely restricted the supported Japanese character set to only a small subset of written Japanese characters (Hiragana only, for example). Therefore, for the reasons discussed in the foregoing section, an improved system and method are needed to implement a user interface for use with Japanese characters.

SUMMARY OF THE INVENTION

In accordance with the present invention, a system and method are disclosed to implement a user interface for use with Japanese characters. More specifically, the present invention includes a system and method for encoding Japanese characters for efficient storage in an electronic device.

Initially, a standard font is encoded and stored in a digital data format using a host computer. Selected text strings are input to the host computer using a computer keyboard or other such input device. In the preferred embodiment, when the host computer initially receives the selected text strings, they are encoded in a standard double-byte digital data format.

Next, a font-encoder compiler program in the host computer sequentially encodes the selected text strings to produce a corresponding output file containing the encoded text strings in a single-byte digital data format. The font-encoder compiler also creates a series of custom fonts in accordance with the present invention.

In practice, the font-encoder compiler sequentially examines each character in the selected text strings to determine whether each examined character is already contained within the standard font or any previously-created custom fonts. If an examined character is already listed, then the font-encoder compiler encodes a location reference pointing to the previously-created font location of the examined character, and then examines the next character in the selected text string.

If, however, the examined character is not already listed in the standard font or any previously-created custom fonts, then the font-encoder compiler determines the optimal location for storing the new character into the custom fonts. The font-encoder compiler may either add the new character to an empty location within an existing custom font, or may create a new custom font to contain the new character and other subsequent new characters. The encoded text strings, the standard font and the custom fonts are then provided to the electronic device. A font manager in the electronic device may then selectively access the standard font and the custom fonts to display the encoded texts strings on the user interface.

The present invention also includes a system and method for enabling a user to input character selections into the electronic device. In practice, a user of the electronic device initially enters a text edit mode to display the basic text edit dialog on the user interface. Then, the user chooses a character category which is preferably displayed in a first-level selection menu. In the preferred embodiment, character categories include upper and lower case Roman, Arabic numerals, Hiragana, Katakana and Kanji.

If the user selects Hiragana or Katakana, then a desired articulation group is next selected from the first-level selection menu. The user may locate the desired articulation group by scrolling through the first-level selection menu until a character representing the desired articulation group is within a fixed-position selection window. Finally, the user chooses a specific character from the selected articulation group which appears in a second-level selection menu displayed on the user interface. In practice, the user may position a moveable selection window to select the desired character. Therefore, the present invention more efficiently and effectively implements a user interface for use with Japanese characters.

BRIEF DESCRIPTION OF THE DRAWINGS

FIG. 1 is a drawing of a conventional vowel-articulation matrix;

FIG. 5A is a drawing of the preferred embodiment for the standard font of FIG. 4;

DETAILED DESCRIPTION OF THE PREFERRED EMBODIMENT

Figure 2:
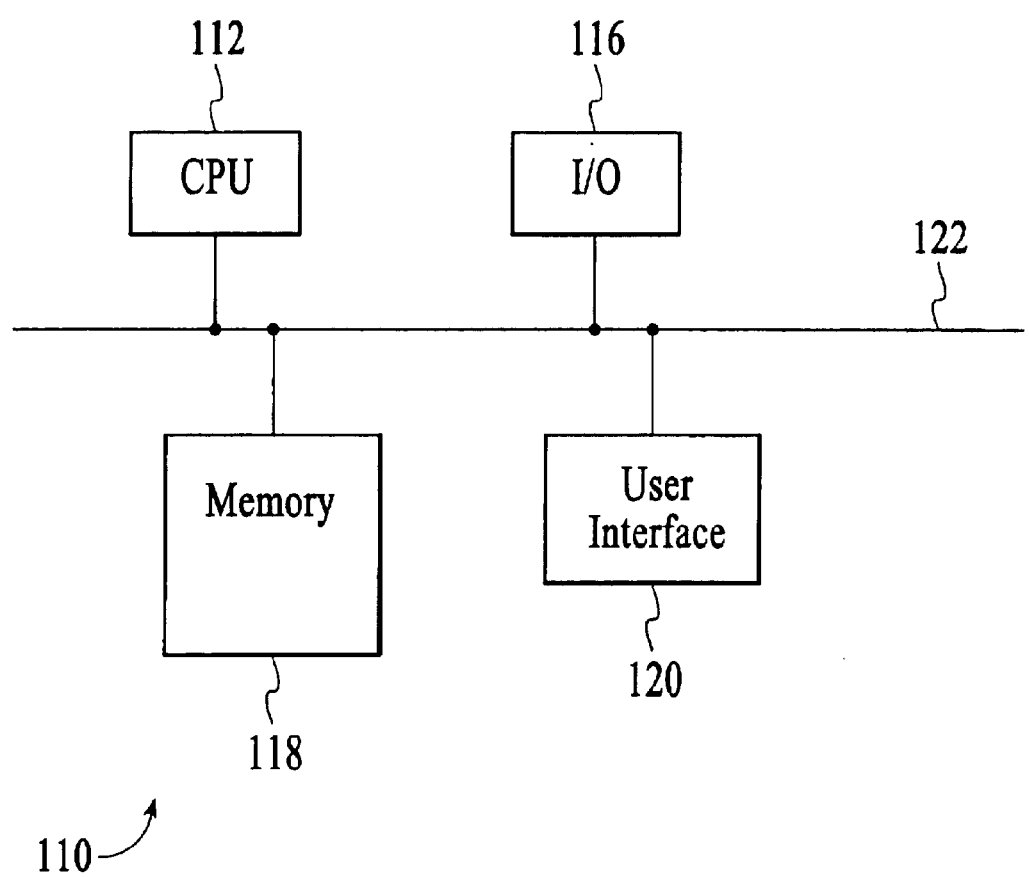
FIG. 2 is a block diagram of one embodiment for an electronic device, in accordance with the present invention.

The present invention relates to an improvement in user interfaces for electronic devices. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention includes a system and method for implementing a user interface for use with a hierarchical language, for example the Japanese language. The invention comprises a system and method for encoding selected text strings and creating custom fonts on a host computer, and a system and method for allowing a user to input characters from the hierarchical language into the electronic device.

Figure 1:
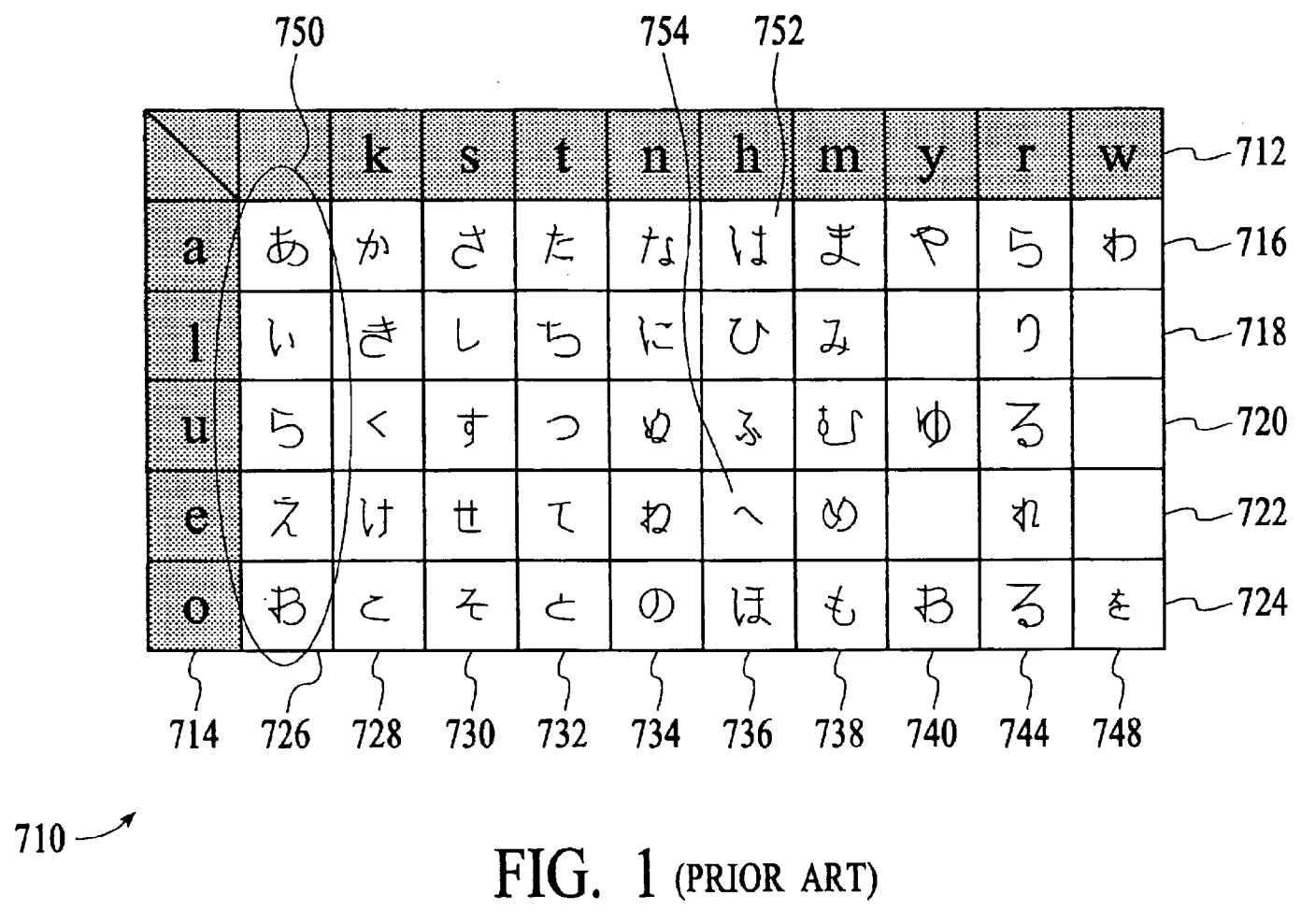

Referring now to FIG. 1, a drawing of a conventional vowel-articulation matrix 710 is shown. The vowel-articulation matrix 710 shows a hierarchical system which subdivides the Japanese Hiragana characters into discrete subsets called articulation groups. Matrix 710 is used in Japanese education to effectively provide an organizational structure for associating character groups to corresponding phonetic syllables to thereby facilitate learning written Japanese.

In FIG. 1, matrix 710 corresponds to Hiragana characters, however, a similar system may readily be used for Katakana characters. Matrix 710 includes a vowel index column 714 containing the vowels a, i, u, e and o, and also includes an articulation index row 712 containing the articulations—(no articulation), k, s, t, n, h, m, y, r, and w. Each Hiragana phonetic syllable may thus be identified by finding an articulation sound from index 712 and then adding a vowel sound from index 714. For example, in matrix 710, the Hiragana character 752 corresponds to the phonetic syllable "ha", and the Hiragana character 754 corresponds to the phonetic syllable "he"

Matrix 710 also includes a series of articulation groups shown in vertical columns 726 through 748. Each articulation group corresponds to one of the ten representative articulations found in articulation index row 712. Each articulation group includes a maximum of five characters each corresponding to one of the five vowel sounds found in vowel index column 714. As illustration, an exemplary articulation group is circled and numbered 750 in FIG. 1. As another example, characters 752 and 754 are both located within the articulation group of column 736. Columns 726 through 748 of matrix 710 thus each form a discrete and individual articulation group.

The present invention thus utilizes a hierarchical approach to select from a relatively large number of characters while using a user interface device that uses a reduced number of input keys. Essentially, the characters are divided into articulation groups for a first selection process and then a final selection may be made from a smaller and more manageable number of character choices. In alternate embodiments, the present invention may readily be utilized to select from various choices other than the Hiragana characters discussed in conjunction with the preferred embodiment.

Referring now to FIG. 2, a block diagram of one embodiment for an electronic device 110 is shown, in accordance with the present invention. In the FIG. 2 embodiment, electronic device 110 comprises a central processing unit (CPU) 112, an input/output interface (I/O) 116, a memory 118 and a user interface 120. Each element of electronic device 110 preferably has an input and an output coupled to a common system bus 122.

Memory 118 may alternately comprise various storage device configurations, including, but not limited to, Random-Access Memory (RAM), Read-Only Memory (ROM), and non-volatile storage devices such as floppy disks and hard disk drives. In the preferred embodiment, electronic device 110 is a small-sized, portable electronic device, such as a digital camera or a personal digital assistant (PDA). In other embodiments, electronic device 110 may alternately be implemented as any type and size of electronic device or system which includes or utilizes a user interface 120.

Figure 3:
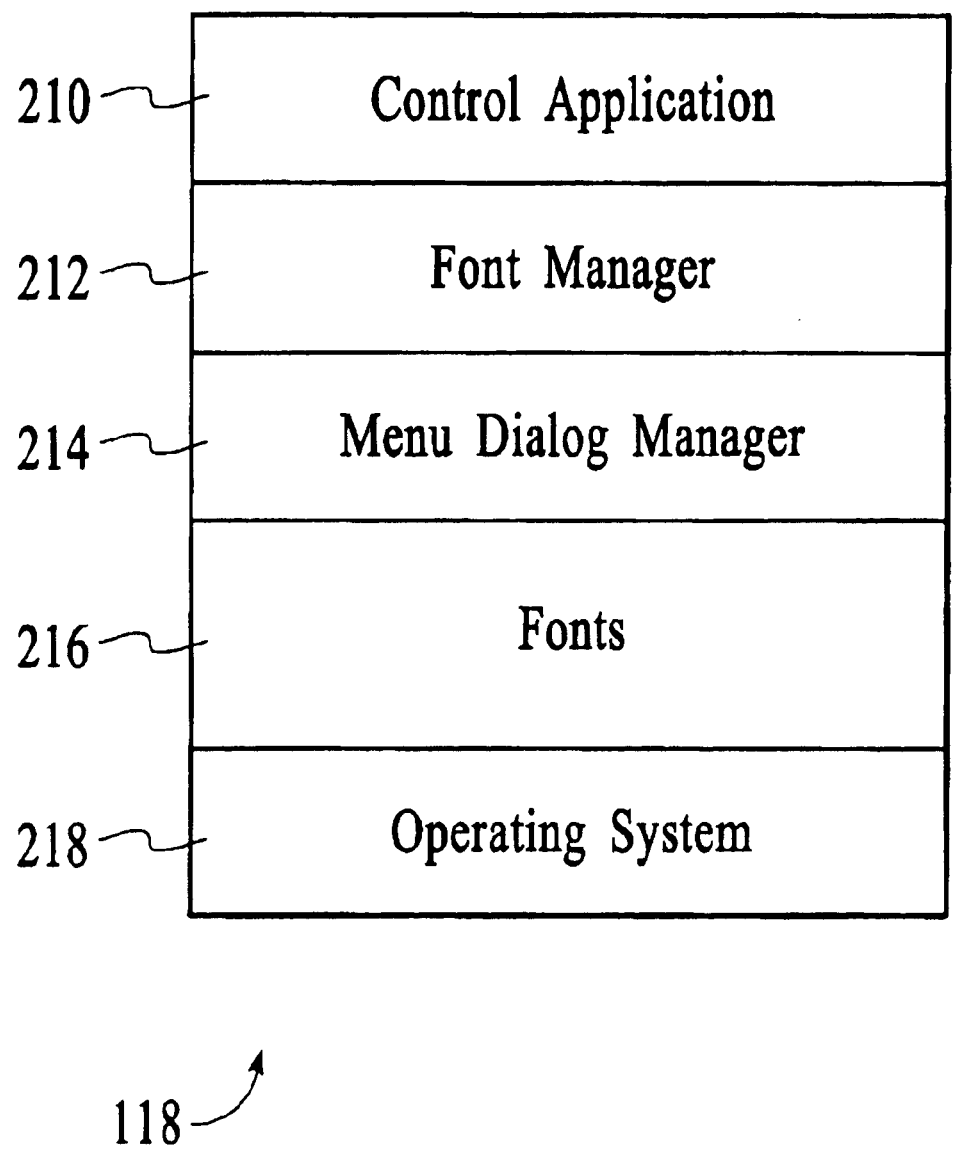
FIG. 3 is a block diagram of one embodiment for the memory of FIG. 2.

Referring now to FIG. 3, a block diagram of one embodiment for memory 118 of FIG. 2 is shown. In an embodiment where electronic device 110 is a digital camera or a PDA, memory 118 preferably includes a control application 210, a font manager 212, a menu dialog manager 214, selected fonts 216 and an operating system 218. In the FIG. 3 embodiment, control application 210 is a software program which controls the high-level operation and functionality of electronic device 110.

Font manager 212 is a software module which is executed by CPU 112 to display Japanese characters on user interface 120 in accordance with the present invention. Font manager 212 is further discussed below in conjunction with FIG. 7. Menu dialog manager 214 is a software module which controls and coordinates the use and operation of user interface 120 in electronic device 110.

Fonts 216 contain sets of characters for display on user interface 120 of electronic device 110. The creation and structure of fonts 216 are further described below in conjunction with FIGS. 4, 5A, 5B and 7. Operating system 218 is a software routine which controls the initialization and basic low-level functionality of electronic device 110.

Figure 4:
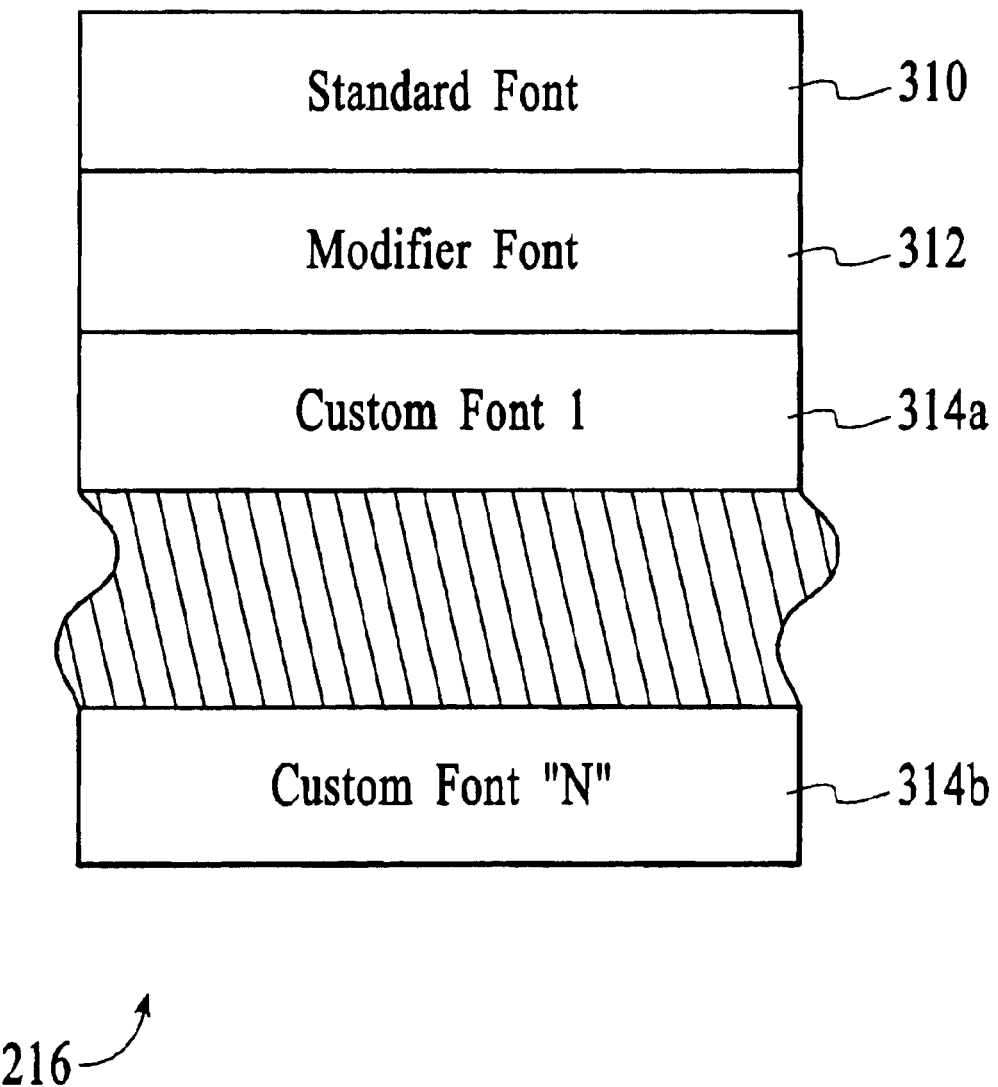
FIG. 4 is a block diagram of one embodiment for the fonts of FIG. 3.

Referring now to FIG. 4, a block diagram of one embodiment for fonts 216 of FIG. 3 is shown. In the FIG. 4 embodiment, fonts 214 include a standard font 310 which is further described below in conjunction with FIG. 5A, and a modifier font 312 which is further described below in conjunction with FIG. 5B. Fonts 214 also preferably include a series of custom fonts 314 which FIG. 4 illustrates as custom font 1 (314(a)) through custom font "N" 314(b). Custom fonts 314 of FIG. 4 are further discussed below in conjunction with FIG. 7.

Referring now to FIG. 5A, a drawing of the preferred embodiment for standard font 310 of FIG. 5A is shown. Standard font 310 preferably contains those characters supported as standard characters within electronic device 110. In the preferred embodiment, standard font 310 may contain up to 255 characters which each may be encoded as a single digital byte of information.

In FIG. 5A, standard font 310 is shown with a column location index 410 and a row location index 412. In practice, the location of any character may be identified by using characters from column location index 410 and row location index 412. For example, the location of an upper-case letter "O" is identified by the number "4" from column location index 410 and the letter "F" from row location index 412.

In the FIG. 5A embodiment, standard font 310 includes the following: a two-column section 414 containing Hiragana characters and selected symbols; a six-column section 416 containing Roman letters, Arabic numbers and selected symbols; a two-column section 418 containing more Hiragana characters and selected symbols; a four-column section 420 containing Katakana characters and selected symbol; a one-column section 422 containing selected symbols; and a one-column section containing selected Kanji characters 424. In alternate embodiments, standard font 310 may readily be implemented using other characters and symbols, in accordance with the present invention.

Figure 5B:
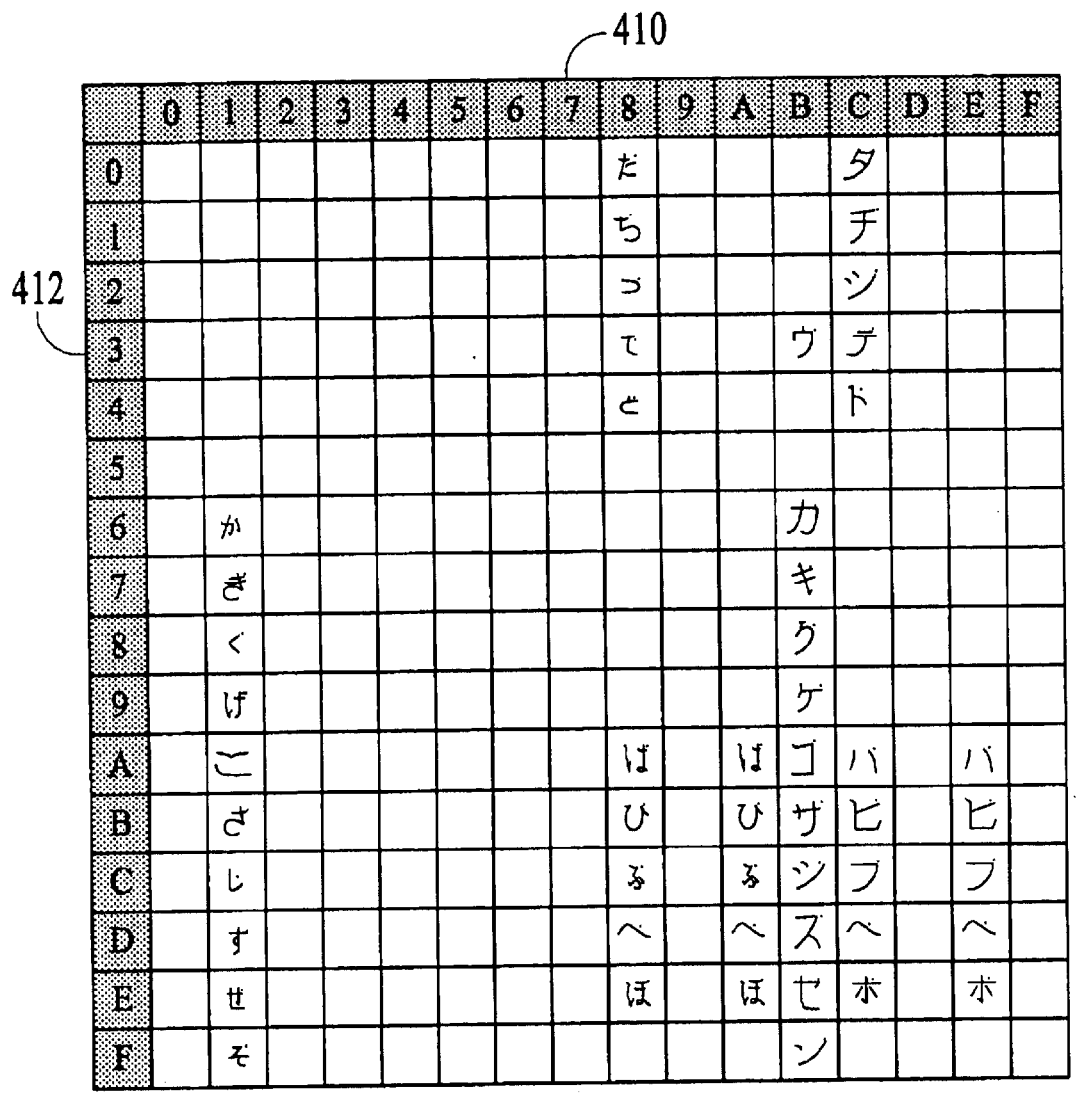
FIG. 5B is a drawing of the preferred embodiment for the modifier font of FIG. 4.

Referring now to FIG. 5B, a drawing of the preferred embodiment for modifier font 312 of FIG. 4 is shown. Modifier font 312 is also shown with a column location index 410 and a row location index 412, as discussed above in conjunction with FIG. 5A. In the preferred embodiment, each location of. modifier font 312 is associated with a corresponding location on standard font 310. In practice, each character in modifier font 312 features a slight modification of the corresponding character in standard font 310. Each modified character from modifier font 312 thus indicates a slight change in the pronunciation of the modified character, as compared to the standard character from standard font 310. The modified characters in modifier font 312 include modifiers of the Dakuon, Handakuon and Youon types.

Figure 6:
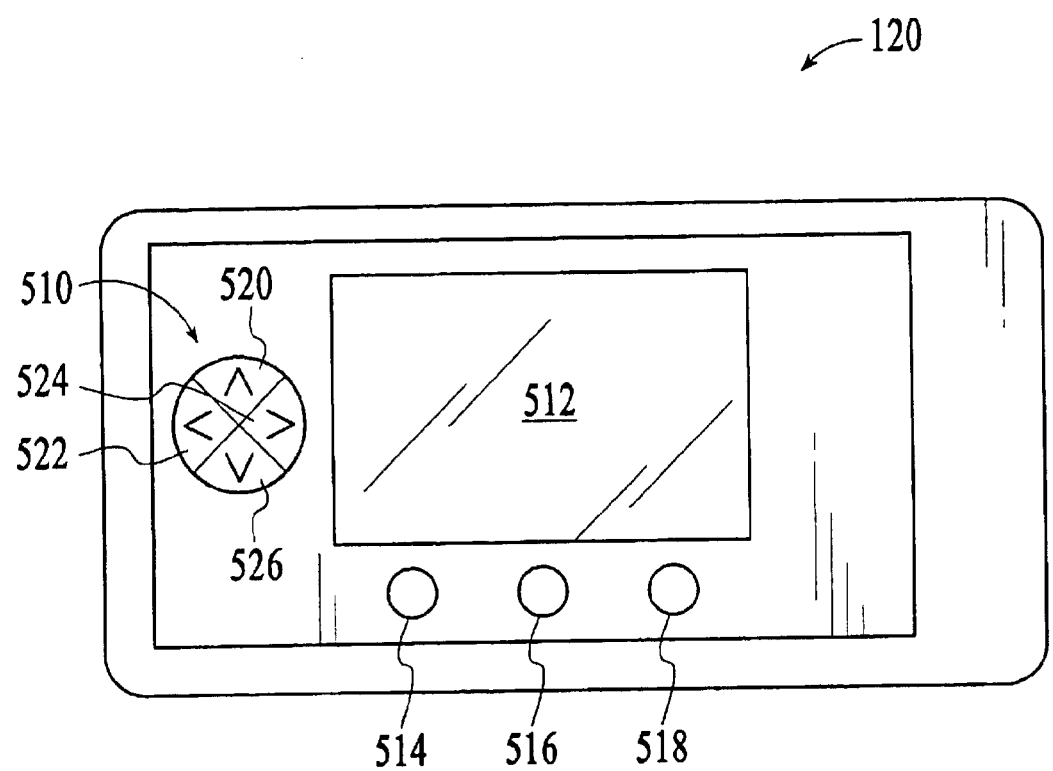
FIG. 6 is an elevation view of one embodiment for the user interface of FIG. 2.

Referring now to FIG. 6, an elevation view of one embodiment for user interface 120 of FIG. 2 is shown. In the FIG. 6 embodiment, user interface 120 includes a four-way navigation control button 510, a display 512, and a set of keys 514, 516 and 518. Four-way navigation control button 510 preferably includes an up button 520, a left button 522, a right button 524 and a down button 526. In the preferred embodiment, display 512 is a liquid crystal display (LCD). However, in alternate embodiment, display 512 may be implemented using any other type of appropriate and effective display technology. Similarly, the input controls of user interface 120 may readily be implemented using various other configurations than that shown in FIG. 6.

Figure 7:
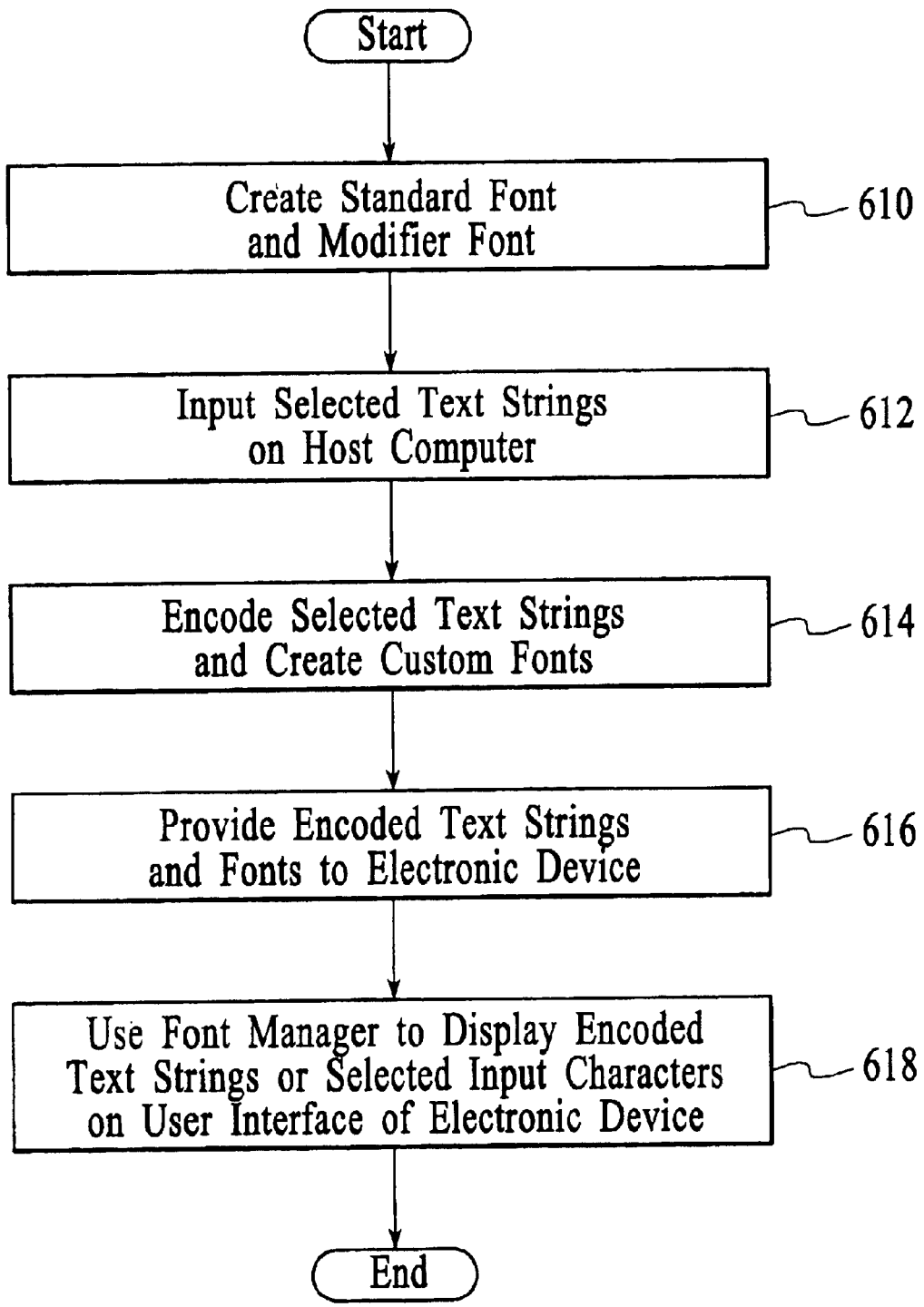
FIG. 7 is a flowchart of method steps for implementing a user interface for use with Japanese characters, according to the present invention.

Referring now to FIG. 7, a flowchart of method steps for implementing a user interface 120 for use with Japanese characters is shown, in accordance with the present invention. Initially, in step 610, a standard font 310 and a modifier font 312 are created on a host computer and are each preferably encoded and stored in a digital data format. In the preferred embodiment, standard font 310 is implemented as previously discussed in conjunction with FIG. 6A, and modifier font 312 is implemented as previously discussed in conjunction with FIG. 6B. However, in alternate embodiments, standard font 310 and modifier font 312 may readily be implemented using various other effective font configurations.

In step 612, selected text strings are input to the host computer using a computer keyboard or other input device. The text strings typically are selected for future display on user interface 120 and are intended for effective user communication with electronic device 110. In the preferred embodiment, when the host computer initially receives the selected text strings, they are encoded in double-byte digital data format. Next, in step 614, a font-encoder compiler in the host computer sequentially encodes the selected text strings to produce a corresponding output file containing the text strings encoded into a single-byte digital data format. One skilled in the art would appreciate how to create such a font-encoder compiler. The font-encoder compiler also creates a series of custom fonts 314 (FIG. 4) in accordance with the present invention.

In practice, the font-encoder compiler sequentially examines each character in the selected text strings to determine whether each examined character is already contained within fonts 216 (standard font 310, modifier font 312 or any previously-created custom fonts 314). If an examined character is already listed within fonts 216, then the font-encoder compiler encodes a location reference pointing to the previously-created font location of the examined character, and then sequentially examines the next character in the selected text string. In the preferred embodiment, the font-encoder compiler may encode the foregoing location reference to include a specific font identifier number and an individual character location within the specified font.

If, however, the examined character is not is already listed in standard font 310, modifier font 312, or any previously-created custom fonts 314, then the font-encoder compiler determines the next available location for storing the new character into custom fonts 314. If no empty locations are available within an existing custom font 314, the font-encoder compiler creates a new custom font 314 to contain the new character and other subsequent characters not contained within fonts 216. The foregoing process thus advantageously prevents storage of duplicate characters within fonts 216 and significantly conserves storage space within memory 118.

In step 616, the encoded text strings are transferred from the host computer to electronic device 110. In the preferred embodiment, the encoded text strings may be stored in font manager 212 within memory 118. Standard font 310, modifier font 312 and custom fonts 314 are also transferred from the host computer to electronic device 110. In the preferred embodiment, standard font 310, modifier font 312 and custom fonts 314 may be stored in fonts 216 within memory 118. In step 618, electronic device 110 uses font manager 212 to display the encoded texts strings on user interface 120 of electronic device 110. Alternately, electronic device 110 may receive character selections from a user via user interface 120 and responsively display the selected characters on user interface 120. The foregoing user input methodology is further described below in conjunction with FIG. 10.

In practice, font manager 212 preferably receives a request for a particular text string from menu dialog manager 214. In response, font manager 212 sequentially reads the corresponding encoded text string (originally received from the font-encoder compiler), and then accesses and retrieves each character of the encoded text string from the appropriate one of fonts 216. As discussed above, each encoded text string contains location information for each character to identify the unique character location within standard font 310, modifier font 312 and custom fonts 314. Font manager 212 then provides the retrieved characters of the requested text string to menu dialog manager 214 for display on user interface 120 of electronic device 110.

Figure 9A:
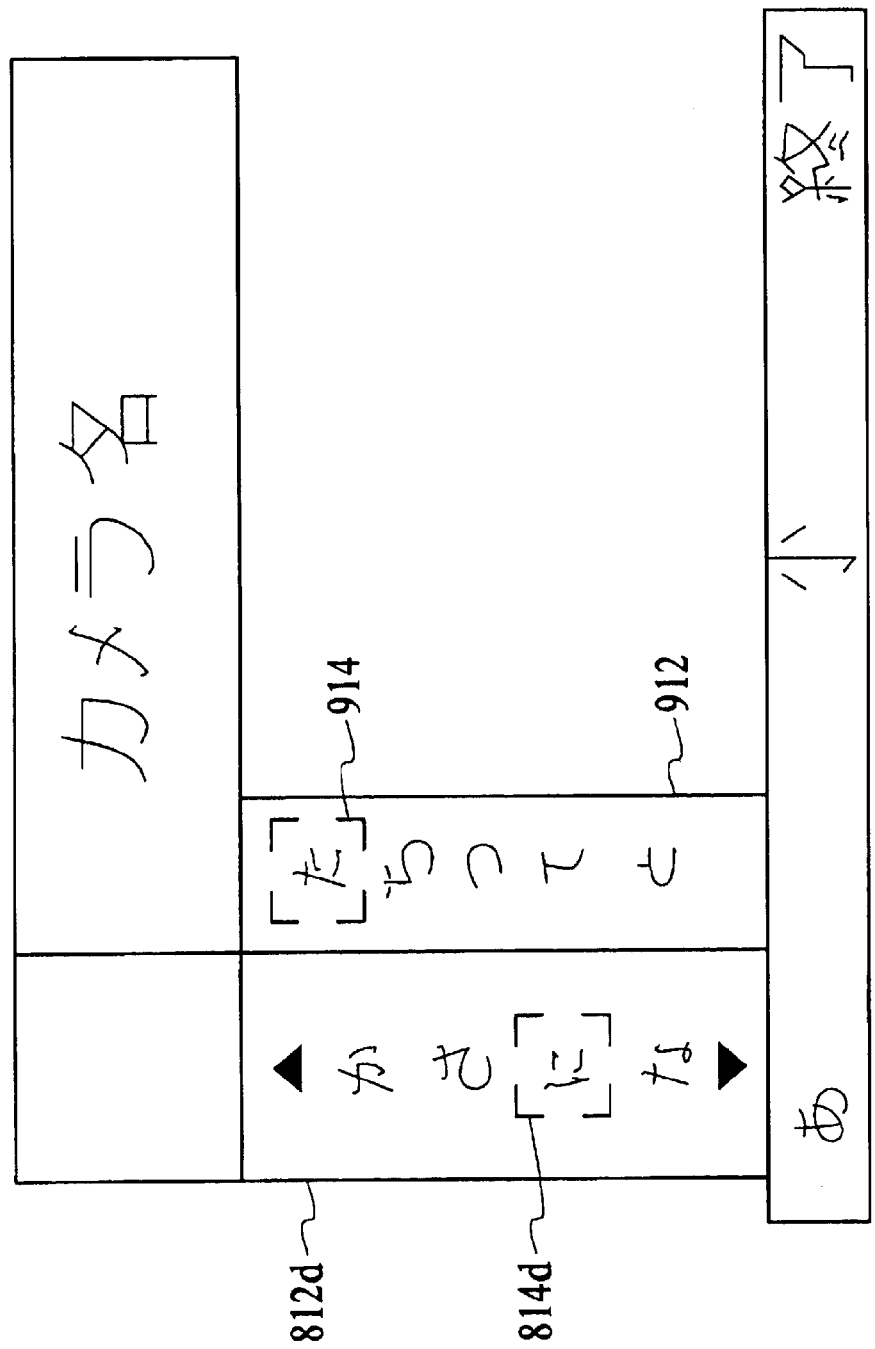
FIG. 9A is a drawing of one embodiment of a text-edit dialog, according to the present invention.
Figure 9B:
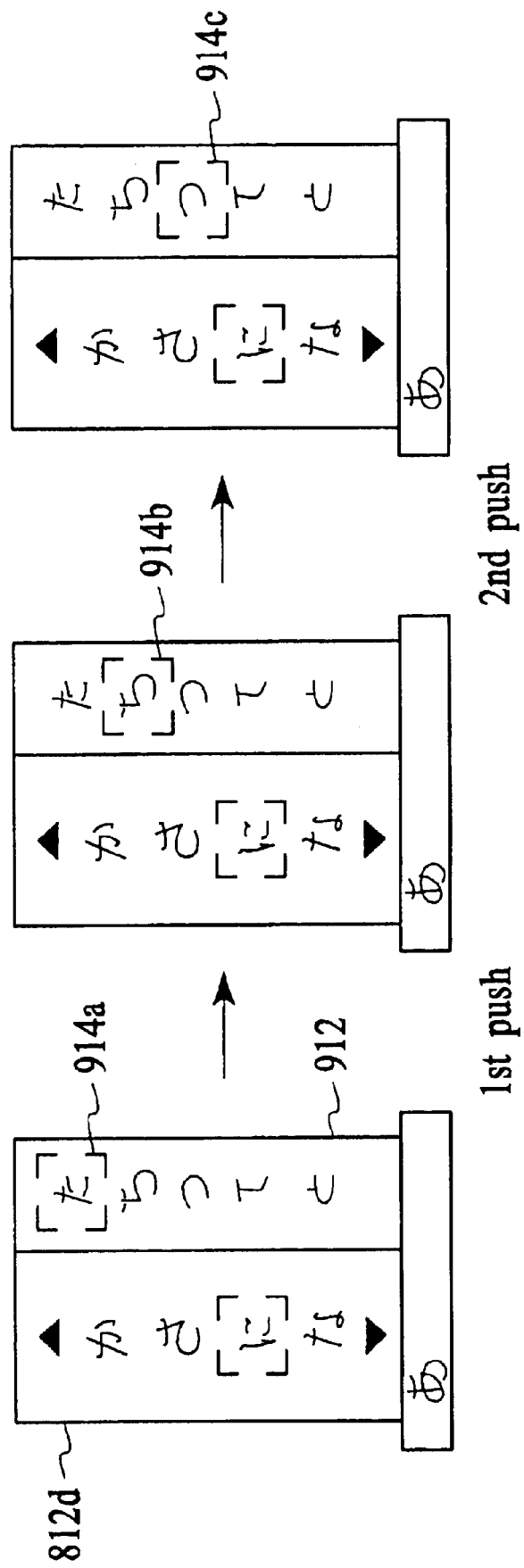
FIG. 9B is a drawing of a sequence of first-level and second-level selection menus, according to the present invention.
Figure 9C:
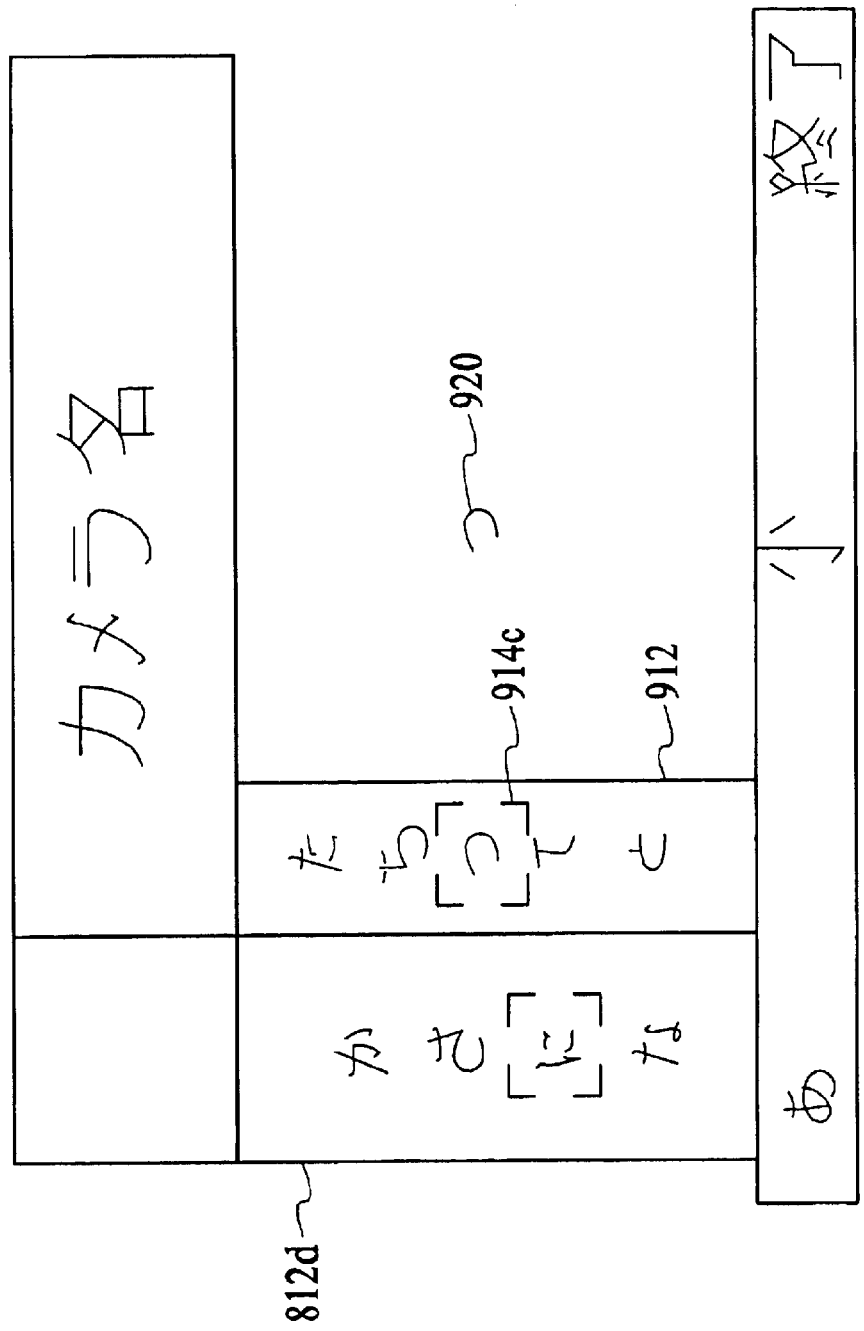
FIG. 9C is a drawing of one embodiment of a text-edit dialog, according to the present invention.
Figure 9D:
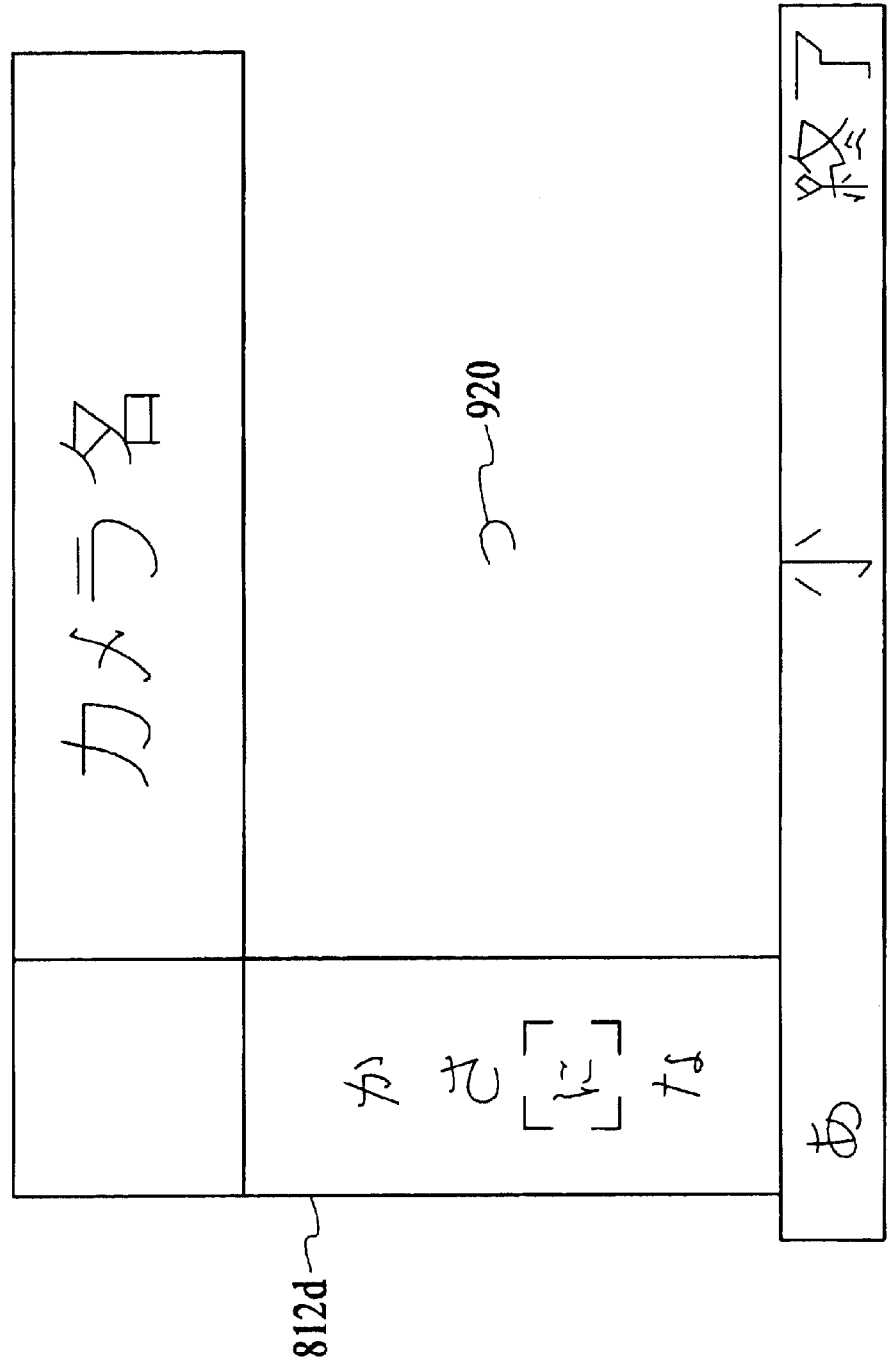
FIG. 9D is a drawing of one embodiment of a text-edit dialog, according to the present invention.
Figure 10:
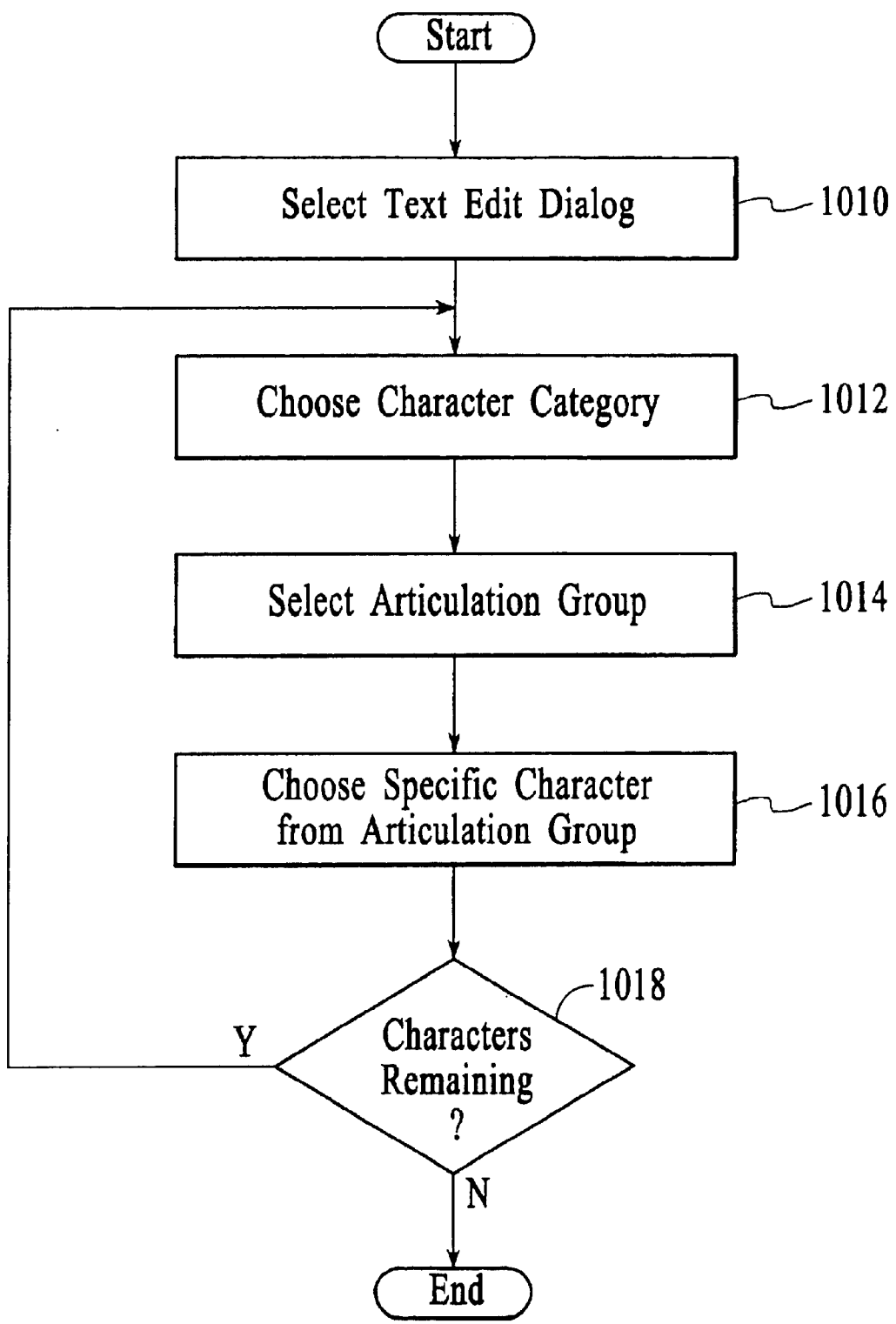
FIG. 10 is a flowchart of method steps for selecting Japanese characters with the user interface of FIG. 6, according to the present invention.

Referring now to FIG. 10, a flowchart of method steps for selecting Japanese characters is shown, in accordance with the present invention. During the course of following discussion of FIG. 10, reference will periodically be also made to FIGS. 8A through 8D and to FIGS. 9A through 9D.

In step 1010, a user of electronic device 110 initially selects and enters a text edit mode to display a basic text-edit dialog (FIG. 8A) on display 512 of user interface 120. The text-edit dialog includes a first-level selection menu 812 and a fixed-position selection window 814.

Figure 8A:
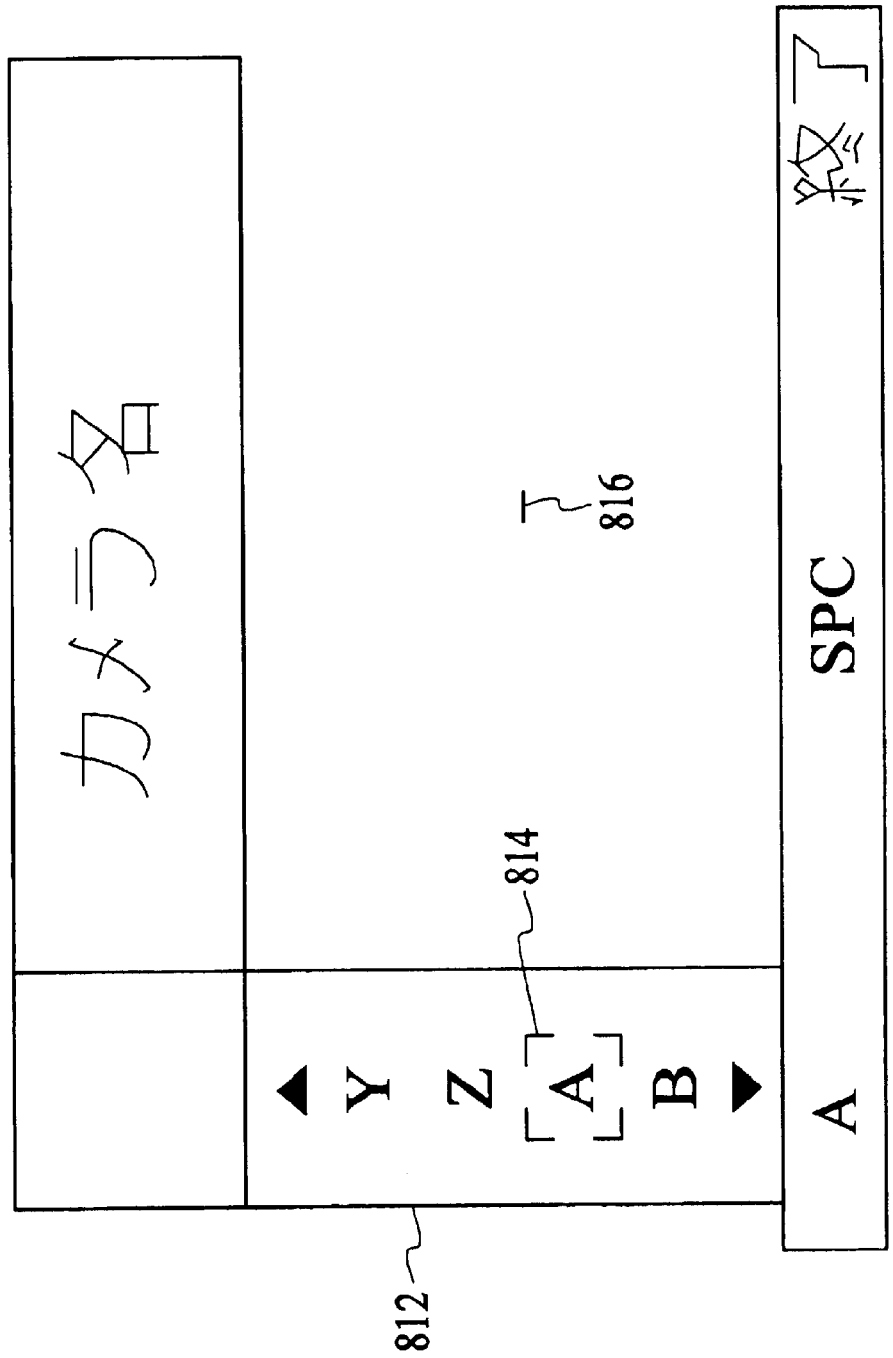
FIG. 8A is a drawing of one embodiment of a text-edit dialog, according to the present invention.
Figure 8B:
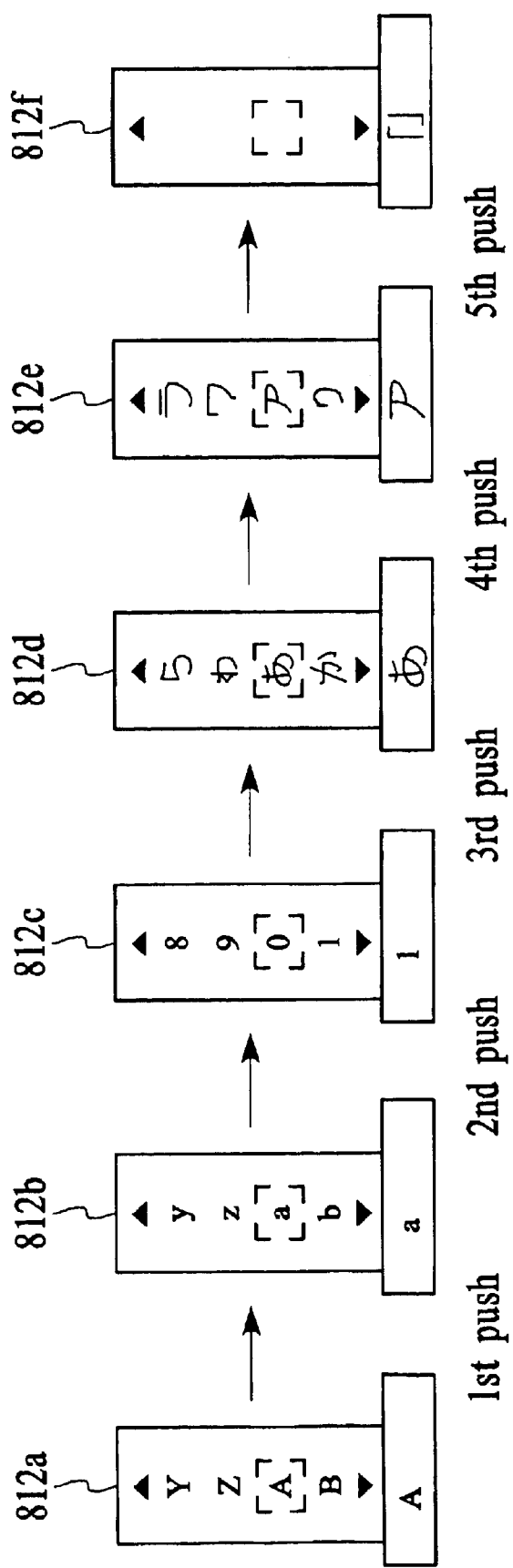
FIG. 8B is a drawing of a sequence of first-level selection menus, according to the present invention.

Then, in step 1012, the user chooses a character category. The selected character category is preferably displayed in first-level selection menu 812. In the preferred embodiment, key 514 of user interface 120 may be used to change character categories. Referring now to FIG. 8B, the initial default character category is preferably upper-case Roman characters 812(a). In the preferred embodiment, one push of key 514 changes first-level selection menu 810 to lower-case Roman characters 812(b), and two pushes of key 514 changes first-level selection menu 810 to Arabic numerals 812(c). Three pushes of key 514 changes first-level selection menu 810 to Hiragana 812(d), four pushes of key 514 changes first-level selection menu 810 to Katakana (812(e), and five pushes of key 514 changes first-level selection menu 810 to Kanji characters 812(f). In alternate embodiments, various other character groups and group selection sequences are likewise equally possible for effectively choosing a character category.

Figure 8C:
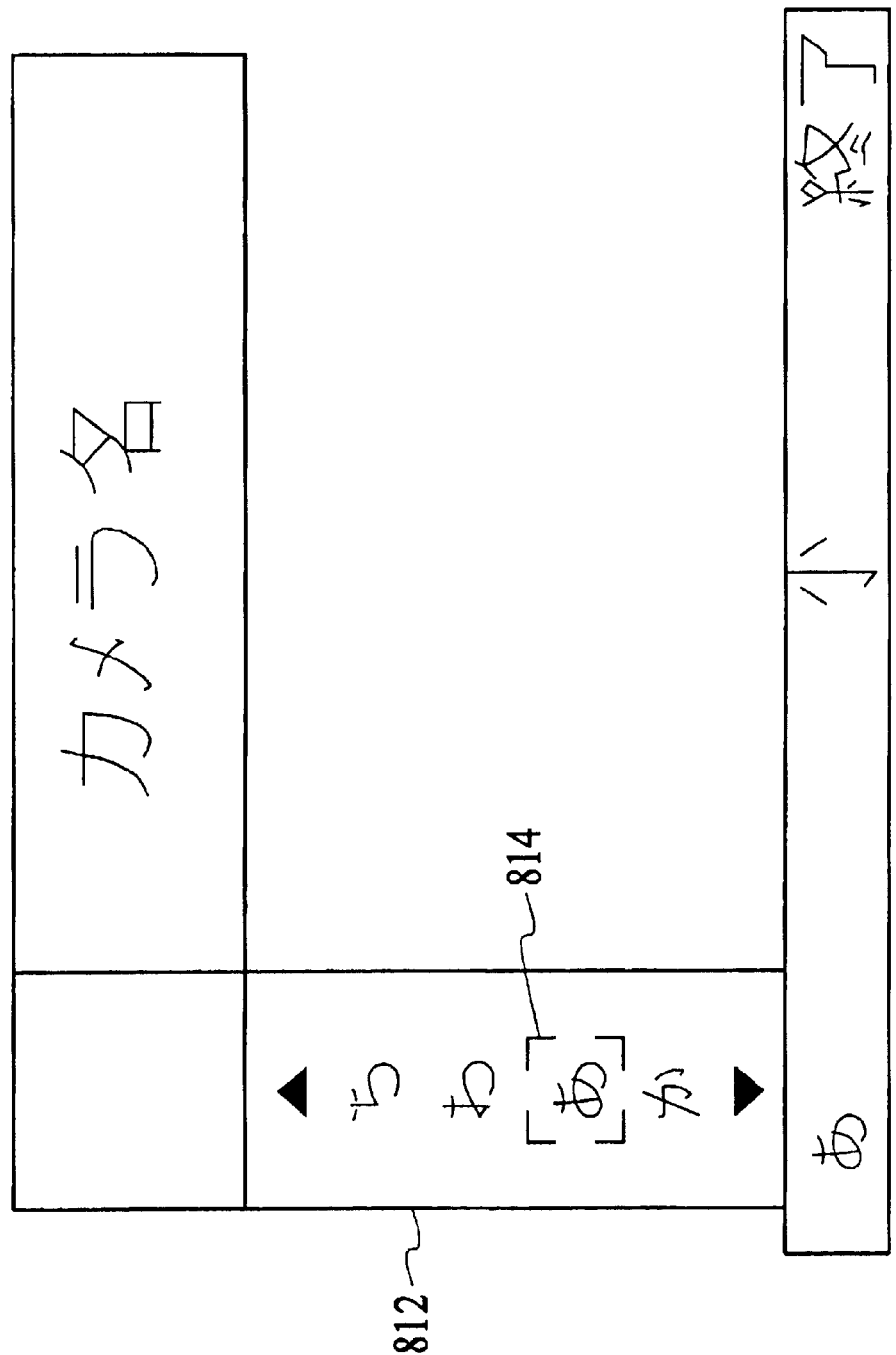
FIG. 8C is a drawing of one embodiment of a text-edit dialog, according to the present invention.

Next, in step 1014 of FIG. 10, the user selects a desired articulation group. In this and the remaining FIG. 10 steps, for purposes of illustration, it will be presumed that, in step 1012, Hiragana was chosen as the desired character category, as shown in FIG. 8C. First-level selection menu 812 of FIG. 8C therefore displays the Hiragana character category. In practice, after the user selects the Hiragana character category, one representative character from each Hiragana articulation group becomes available via first-level selection menu 812. In the preferred embodiment, the representative characters available via first-level selection menu 812 are also those characters shown in horizontal row 716 of vowel-articulation matrix 710 (FIG. 1). As an illustration of the foregoing, the fixed-position selection window 814 of FIG. 8C contains a Hiragana character for the phonetic syllable "a" of vowel-articulation matrix 710 (FIG. 1).

Figure 8D:
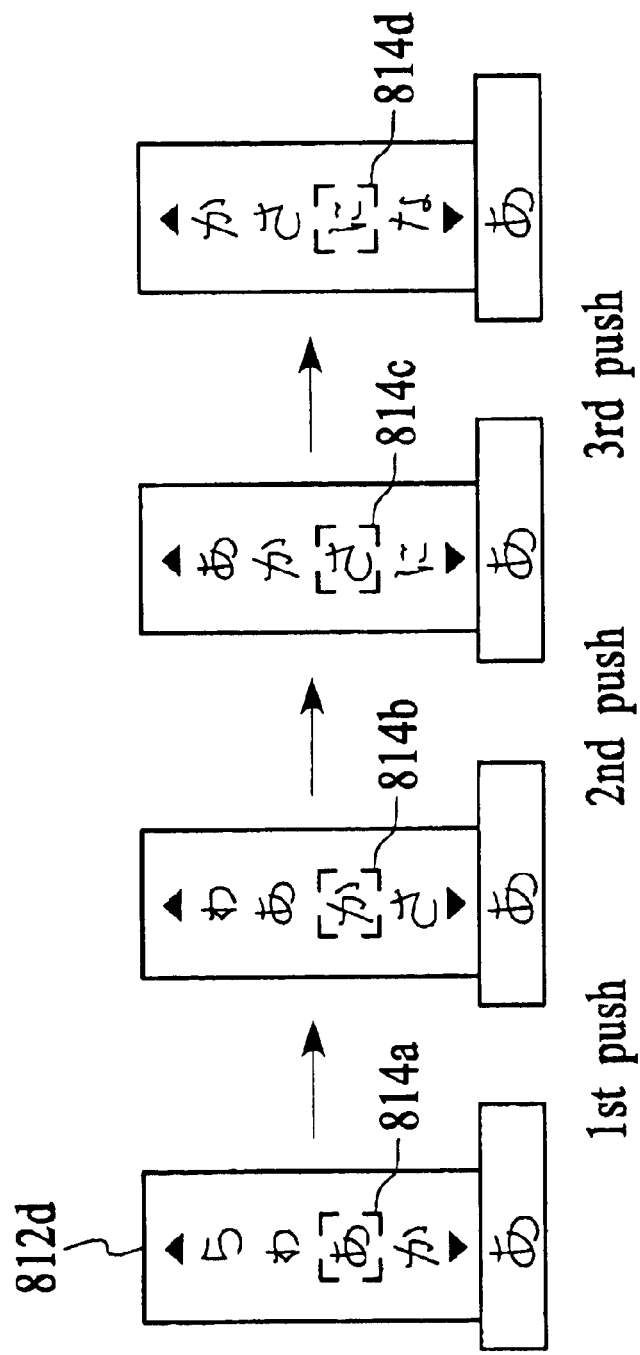
FIG. 8D is a drawing of a sequence of first-level selection menus, according to the present invention.

The user may therefore locate the desired articulation group by scrolling through first-level selection menu 812 until a character representing the desired articulation group is within fixed-position selection window 814. In practice, the contents of first-level selection menu 812 may be scrolled towards the top of first-level selection menu 812 by using up button 520, and may be scrolled toward the bottom of first-level selection menu 812 by using down button 526 of user interface 120 (FIG. 6). The process of scrolling characters towards the top of first-level window 812 is illustrated in FIG. 8D in which fixed-position window 814(a) of first-level menu 812(d) initially contains the character for the syllable "a". In the preferred embodiment, a first push of up button 520 places the character for the syllable "ka" within fixed-position window 814(b). A second push of up button 520 places the character for the syllable "sa" within fixed-position window 814(c). A third push of up button 520 places the character for the syllable "ta" within fixed-position window 814(d). When the desired articulation group is represented by a character located within fixed-position window 814, then the selected articulation group may preferably be selected using right button 524 of user interface 120.

In step 1016, the user chooses a specific character from the selected articulation group. In the preferred embodiment, when the desired articulation group is selected in step 1014, then a second-level selection menu is added to the text-edit dialog on user interface 120, as illustrated in FIG. 9A. The second-level selection menu 912 preferably displays all the characters from the selected articulation group (which is one of the Hiragana articulation groups discussed previously in conjunction with FIG. 1). Second-level selection menu 912 preferably includes a moveable selection window 914.

The user may then position the specific desired character within moveable selection window 914 and press right button 524 to select the desired character. In practice, moveable selection window 914 may preferably be scrolled towards the top of second-level menu 912 by using up button 520, and may be scrolled towards the bottom of second-level menu 912 by using down button 526 of user interface 120 (FIG. 6).

For example, FIG. 9B shows moveable selection window 914(a) positioned around the top character in second-level selection menu 912. A first push of down button 526 scrolls moveable selection window 914(b) down one position to encompass the character for the syllable "ti". A second push of down button 526 scrolls moveable selection window 914(c) down one more position to encompass the character for the syllable "tu".

In the preferred embodiment, the character contained in moveable selection window 914 may then be input to device 110 by pressing right button 524 of user interface 120. The selected character 920 is then responsively displayed on user interface 120, as shown in FIG. 9C.

Finally, in step 1018, if the user desires to input more characters, the FIG. 10 process returns to step 1012. In the preferred embodiment, the user pushes the left button 522 to input more characters and the second-level selection menu 914 disappears from the text-edit dialog of user interface 120, as shown in FIG. 9D. A second push of left button 522 will delete the input character 920. If, however, no further characters remain to be input, then the FIG. 10 process ends.

An additional feature of the present invention is available during step 1016 of FIG. 10. Once a selected articulation group is displayed in second-level selection menu 912, then key 516 of user interface 120 may be used to alter the standard characters from the selected articulation group to corresponding modified characters from modifier font 312. In practice, pressing key 516 once changes the standard characters for the selected articulation group into conventional Dakuon characters, pressing key 516 twice changes the standard characters into conventional Handakuon characters and pressing key 516 three times changes the standard characters into conventional Youon (Hatsuon) characters.

The FIG. 10 method thus utilizes a hierarchical approach to select from a relatively large number of characters while using a somewhat limited user interface device. Essentially, the characters are divided into articulation groups for a first selection process and then a final selection may be made from a smaller and more manageable number of character choices. In alternate embodiments, the present invention may readily be utilized to select from various choices other than the Hiragana characters discussed in conjunction with FIG. 10.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems and languages other than the one described above as the preferred embodiment. Therefore, these and other variations upon the preferred embodiments are intended to be covered by the present invention, which is limited only by the appended claims.

What is claimed is:

1. A system for implementing a user interface for displaying selected characters from a hierarchical language in a hand-held electronic device having a display, comprising:
   a standard font of standard characters to be displayed on said hand-held electronic device;
   selected text strings to be displayed in said user interface of said hand-held electronic device, said text strings being in two-byte format; and
   a font-encoder compiler in a host computer, said font-encoder compiler including:
   means for encoding said selected text strings as single-byte encoded strings and creating one or more custom fonts of characters from said standard font and said selected text strings, said custom fonts created by examining each character in said selected text strings to determine whether each character is already present within set of fonts that are to be downloaded into said hand-held electronic device, said set of fonts that are to be downloaded including said standard font and said one or more custom fonts created by said font encoder compiler, wherein
      if an examined character is already present, encoding a location reference pointing to a previous-created font location of said examined character in said set of fonts, and
      if said examined character is not present, then determining a next available location in said set of fonts for storing said examined character, whereby storage of duplicate characters is prevented; and
   means for encoding custom font characters of said selected text strings as single-byte encoded strings using said custom fonts,
      wherein said standard font, said one or more custom fonts, and said encoded strings are downloaded to and stored on said hand-held electronic device, wherein the standard font and one or more custom fonts are selectively accessed for display of the encoded strings during user operation of the electronic device.

2. The system of claim 1 wherein said hierarchical language is Japanese and said standard font includes a complete set of Hiragana characters, a complete set of Katakana characters, a complete set of Roman characters and a subset of Kanji characters.

3. The system of claim 2 further comprising a modifier font containing modified characters from said standard font.

4. The system of claim 3 wherein said user interface in said hand-held electronic device is for a digital camera.

5. The system of claim 1 wherein the characters in the single-byte text strings, encoded by the means for encoding, represent the same characters as the corresponding characters in the two-byte text strings.

6. The system of claim 1 wherein the standard font consists of characters in a single-byte format.

7. A method for implementing a user interface for displaying selected characters from a hierarchical language in a hand-held electronic device having a display, comprising said steps of:
   providing a standard font of standard characters to be displayed on said hand-held electronic device;
   selecting text strings to be displayed in said user interface of said hand-held electronic device, said text strings being in two-byte format;
   inputting said standard font and said selected text strings into a font-encoder compiler in a host computer;
   using said font-encode compiler to encode said selected text strings as single-byte encoded strings and create a custom font of characters included in said text strings by,
   examining each character in said selected text strings to determine whether each character is already present within a set of fonts that are to be downloaded into said hand-held electronic device, said set of fonts to be downloaded including said standard font and said custom font;
   if an examined character is already present, using said font-encoder compiler to encode a location reference pointing to a previously-created font location of said examined character in said set of fonts;

if said examined character is not present, then determining a next available location in said set of fonts for storing said examined character, whereby storage of duplicate characters is prevented, and using said custom font to encode custom font characters of said selected text strings as single-byte encoded strings; and providing said standard font, said custom font, and said encoded strings for download to and storage on said hand-held electronic device, wherein said standard font and said custom font are selectively accessed for display of the encoded strings during user operation of the electronic device.

8. The method of claim 7 wherein said standard font includes a complete set of Hiragana characters, a complete set of Katakana characters, a complete set of Roman characters and a subset of Kanji characters.

9. The method of claim 8 further comprising a modifier font containing modified characters from said standard font.

10. The method of claim 9 further comprising the steps of:

providing a font manager in said hand-held electronic device for selectably accessing said standard characters and said custom characters to display said text strings on said user interface, the selectable accessing of said characters from said hierarchical language being made by accessing successive menu levels of said hierarchical structure by, allowing a user to select a text edit dialog on said user interface;

allowing said user to choose a character category from a first-level selection menu, wherein said character categories include at least two of Roman characters, Arabic numerals, Hiragana characters, Katakana characters, and Kanji characters;

allowing said user to select an articulation group from within said character category by scrolling through the first-level selection menu until a character representing a desired articulation group is within a fixed-position selection window; and allowing said user to choose a specific character from within said articulation group from a second-level selection menu.

11. The method of claim 7 wherein the characters in said encoded single-byte text strings represent the same characters as the corresponding characters in said two-byte text strings.

12. The method of claim 7 wherein the standard font consists of characters in a single-byte format.

* * * * *